United States Patent Office 3,709,888
Patented Jan. 9, 1973

---

3,709,888
ARYL-SUBSTITUTED-PYRIDO[2,3-d]PYRIMIDIN-2-ONES
Goetz E. Hardtmann, Florham Park, N.J., assignor to Sandoz-Wander, Inc., Hanover, N.J.
No Drawing. Continuation-in-part of application Ser. No. 870,445, Oct. 20, 1969. This application June 1, 1970, Ser. No. 42,538
Int. Cl. C07d 57/20
U.S. Cl. 260—256.4 F         16 Claims

ABSTRACT OF THE DISCLOSURE

Compounds are of the class of aryl-substituted-1-substituted-4-aryl-pyrido[2,3-d]pyrimidin-2-ones, which are useful as anti-inflammatory agents. Intermediates for preparation include the corresponding 1-unsubstituted-4-aryl-pyrido[2,3-d]pyrimidin-2-ones, compounds which are pyridyl-phenyl ketone imines and compounds which are aryl-substituted-2-amino-nicotinonitriles of which the latter are also useful as anti-inflammatory agents.

---

This application is a continuation-in-part of copending application Ser. No. 870,445, filed Oct. 20, 1969, now abandoned.

This invention relates to bicyclic compounds. In particular, the invention pertains to 1,2-dihydro-pyrido[2,3-d]pyrimidin-2-ones from the group of 1-substituted-4-aryl-1,2 - dihydro - pyrido[2,3-d]pyrimidin-2-ones and 1-substituted-4-aryl-1,2,3-4-tetrahydro-pyrido[2,3-d] - 2 - ones and to methods of preparing such compounds. The invention also relates to intermediates which are useful in preparation of the above compounds including certain aryl-substituted-2-amino-nicotinonitriles which are also useful pharmaceutical agents, and to the preparation of said intermediates. The invention further relates to pharmaceutical compositions and methods utilizing the said 1,2-dihydropyrido[2,3-d]pyrimidin-2-ones and said aryl-2-amino-nicotinonitriles.

The pyrido[2,3-d]pyrimidin-2-ones of the invention may be represented by the structural Formula I:

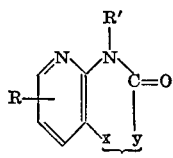

wherein

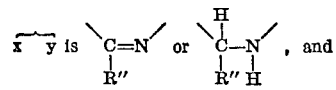

R' is lower alkyl of 1 to 6 carbon atoms, e.g., methyl, ethyl, propyl, isopropyl, t-butyl, etc.; allyl; methallyl; propagyl; or cycloalkyl of 3 to 6 carbon atoms, e.g., cycopropyl; and
R is

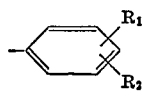

each of $R_1$ and $R_2$ is independently hydrogen, halo of atomic weight of from 19 to 80 or lower alkoxy of 1 to 3 carbon atoms,
R'' is phenyl or substituted phenyl of the formula:

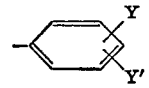

and
Y represents halo of atomic weight of from 19 to 80; lower alkyl of 1 to 4 carbon atoms; or lower alkoxy of 1 to 4 carbon atoms; and
Y' represents hydrogen, halo, lower alkyl or lower alkoxy (all as defined for Y).

A preferred method for preparation of compounds of Formula I in which

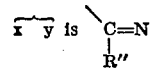

and referred to herein as Procedure A involves the cyclization of a pyridyl-phenyl ketone imine of Formual II

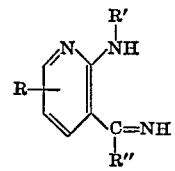

II wherein R, R' and R'' are as above-defined, preferably by subjecting said compound II to reaction with phosgene, followed by working up by established techniques to obtain a 1,2 - dihydro - pyrido[2,3-d]pyrimidin-2-one of Formula IA:

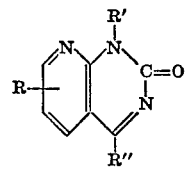

IA

An alternative method referred to herein as Procedure B for preparation of compounds I in which

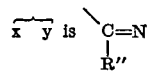

involves subjecting an alkali metal salt of a 1,2-dihydro-pyrido[2,3-d]pyrimidin-2-one of the Formula III:

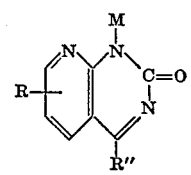

III wherein R and R'' are as above-defined, and M is an alkali metal, preferably sodium or potassium, to reaction with an organic halide of Formula IV:

R'X      IV wherein R' is as above-defined, and X is halo of atomic weight of from 35 to 130, preferably iodo, followed by working up in a known manner to obtain a 1,2-dihydro-pyrido[2,3-d]pyrimidin-2-one of Formula IA.

The compounds of Formula I in which

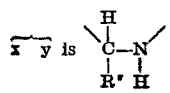

are preferably prepared from the compounds of Formula IA by a Procedure C involving subjecting a compound IA to reduction with a borohydride to obtain a 1,2,3,4-tetrahydro-pyrido[2,3-d]pyrimidin-2-one of Formula IB:

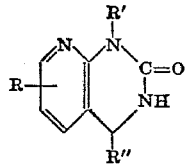

wherein R, R' and R" are as above-defined.

The production of compounds IA by Procedure A involving cyclization of a compound II is preferably carried out with phosgene as the cyclizing reagent and at temperatures in the range of 0° C. to 50° C., more usually 10° C. to 30° C. The reaction of compound II with phosgene is suitably carried out in an inert solvent which may be any of several of the conventional and well-known organic solvents. Representative of the preferred organic solvents are the aromatic solvents such as benzene, toluene, xylene and the like, more preferably benzene. The mol ratio of phosgene to compound II is not particularly important and a substantial excess of phosgene is employed in the preferred forms of practice to obtain the more efficient reaction rates. The reaction may be carried out in the presence of an acid binding agent of known type such as a tertiary amine, e.g., a trialkyl amine such as triethylamine.

The preparation of compounds IA by Procedure B involving reaction of the 1-metallo-pyrido[2,3-d]pyrimidin-2-one of Formula III with the organic halide of Formula IV may be carried out at temperatures of from 10° C. up to about 100° C., most conveniently at about room temperature (20° C.). Desirably, the reaction of the 1-metallo salt III with the appropriate halide, preferably the iodide, is carried out in the same solvent employed to prepare the 1-metallo derivative (III). The preparation of the latter is readily carried out by treating the corresponding 1-unsubstituted pyrido[2,4-d]pyrimidin-2-one in conventional manner, with any of the conventional agents commonly employed for preparing alkali metal salts, e.g., sodium hydride and the alkali metal alkoxides such as sodium methoxide, sodium ethoxide, potassium methoxide and potassium ethoxide. The formation of the salt, preferably the sodium or potassium salt, is conveniently carried out in a suitable inert organic solvent, e.g., dimethylacetamide, diethylacetamide, dimethylformamide, dimethylsulfoxide and dioxane, and at room temperature.

The preparation of compounds IB by Procedure C is achieved by chemical reduction of a compound IA employing an alkali metal borohydride reducing agent, e.g., sodium borohydride. The reduction is conveniently effected in a suitable organic solvent, e.g., a lower alkanol such as methanol or ethanol, and mixtures of lower alkanols with methylene chloride, dioxane or water. The reaction may be suitably carried out at temperatures in the range of 10° C. to about 80° C., preferably about 20° C. to 40° C.

As above indicated, Procedures A and B represent preferred procedures by which compounds of Formula IA may be produced. The procedure actually preferred in any given situation may vary depending upon any one of several known factors such as the particular compound to be produced, the cost and ready availability of starting materials, yields and the like. In the usual situation, the Procedure A is preferred for preparation of compounds IA in which R' is a branched lower alkyl and the branching occurs on the carbon atom attached to the cyclic nucleus, e.g. R' is isopropyl.

A preferred method for preparation of the pyridyl-phenyl ketone imines of Formula II employed as starting material in Procedure A involves a two-step procedure wherein in a Step 1 a 2-chloronicotinonitrile of Formula V:

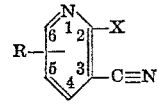

wherein R is an above-defined and X is chloro or bromo, is reacted with an organic amine of Formula VI:

wherein R' is as above-defined, to obtain a 2-amino-nicotinonitrile of Formula VII:

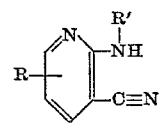

wherein R and R' are as defined, said compound VII then being reacted in a Step 2 with an aryl Grignard reagent or aryl lithium compound respectively of Formulae VIII and IX:

and

wherein R" is as defined, and X is chloro or bromo, followed by hydrolysis and working up in a conventional manner to obtain the desired pyridyl-phenyl ketone imine of Formula II.

The preparation of compounds of the Formula VII by the reaction of Step 1 may be suitably carried out at temperatures in the range of from 10° C. to 140° C., preferably 50° C. to 130° C. The reaction is conveniently carried out in an inert liquid medium which may be provided by employing an excess of the compound VI when it is liquid under the reaction conditions and/or by employing an inert organic solvent of known type. The latter may be any of the several conventional organic solvents including by way of illustration the lower alkanols such as ethanol, the aromatic solvents such as benzene, the ethers of both non-cyclic and cyclic types such as dimethoxyethane and tetrahydrofuran and the well known amides such as dimethylacetamide, dimethylformamide and the like. A preferred solvent of conventional type is ethanol. The reaction product of Formula VII may be obtained from the reaction mixture of the Step 1 reaction by working up by conventional procedures.

The preparation of compounds of Formula II in Step 2 by reaction of a compound VII with an arylmagnesium halide of Formula VIII or aryl lithium compounds IX involves the usual well known type reaction preferably carried out in a solvent conventional for such reactions, for example, the acyclic or cyclic ethers such as diethyl ether, dioxane and tetrahydrofuran, preferably a cyclic ether. The usually preferred mode of carrying out Step 2 involves use of an arylmagnesium bromide of formula VIII and temperatures usually in the range of 20° C. to 100° C., more usually 40° C. to 80° C. In general, the reaction of Step 2 is followed by controlled alkaline hydrolysis in the conventional manner. The reaction products of Formula II may be recovered from Step 2 by working according to established procedures.

The compounds of Formula V employed in Step 1 are of known type which may be prepared by halogenation in a known manner at temperatures in the range of 50° C. to 150° C. in the presence or absence of added organic solvents of the corresponding aryl-substituted-3-cyano-2

(1H))-pyridones, as illustrated hereinafter in Step C of Example 1. The said corresponding pyridones are either known or may be prepared by procedures known from the literature, for example, as described in Bull. Soc. Chim. (France) 1966, 2387; Org. Synth., Col. Vol. IV, p. 166 and 704 ff.: J. Am. Chem. Soc. 69, 2574; and Pyridine and Its Derivatives, Part III, pp. 179 et seq. (Interscience Pubs.).

The 1-metallo-pyrido[2,3-d]pyrimidin-2-ones of Formula III are prepared from their corresponding 1-unsubstituted-pyrido[2,3 - d]pyrimidin-2-ones of Formula IIIA and the latter are preferably prepared in a Step 3 by reacting an appropriately substituted 3-(2-amino)pyridyl-phenyl ketone of Formula X:

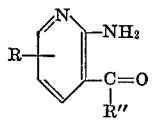

X wherein R and R″ are as defined, with ethyl carbamate in the presence of a Lewis acid, to obtain the compounds of Formula IIIA:

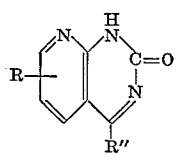

IIIA wherein R and R″ are as defined.

Preparation of compounds IIIA by Step 3 is desirably carried out at elevated temperature of from 160° C. to 230° C. and in the presence of a Lewis acid as catalyst, preferably zinc chloride. The reaction is conveniently carried out employing an excess of the ethyl carbamate as solvent medium.

The 3-(2-amino)pyridyl-phenyl ketones of Formula X ar novel compounds which may be prepared, for example, by reacting a compound of the Formula V with ammonia in ethanol at temperatures in the range of from 20° C. to 80° C. to obtain the corresponding aryl-substituted-2-amino-nicotinonitrile which is then reacted in the manner of the Step 2 reaction except that the following hydrolysis is an acid hydroylsis conducted in a known manner, for example, with 2.0–5.0 N hydrochloric acid in ethanol and water at temperatures between 15° C. to 60° C. Other procedures analogous to those described in the literature may also be applied to the preparation of compounds X, for example, by R. Littel et al., J. Med. Chem. 5, 72 (1965).

Compounds of Formula IA may also be prepared by a Procedure A–1 involving the cyclization of a pyridyl-phenyl ketone of the Formula XI:

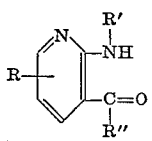

XI wherein R, R′ and R″ are as defined above, with an alkyl carbamate in which the alkyl is of 1 to 5 carbon atoms, at elevated temperatures.

Procedure A–1 is suitably carried out at temperatures of from 140° C. to 200° C., preferably 160° C. to 180° C. The mole ratio of carbamate to the compound of Formula XI is not critical, and there is preferably employed a substantial excess of carbamate which also serves as the preferred solvent for the reaction. Other suitable high boiling organic solvents which are inert under the reaction conditions may alternatively or additionally be employed, desired. The especially preferred carbamate is urethane.

The reaction time may for example range from ½ to 10 hours, more usually 1 to 4 hours. The reaction is desirably conducted in the presence of a Lewis acid as catalyst.

The amount of Lewis acid employed is preferably between about 5% to 20% based on the weight of compound of Formula XI. The preferred catalyst is zinc chloride. The compounds of Formula XI are novel and may be prepared by the procedures of Steps 1 and 2 described herein for preparation of compounds II except that the hydrolysis following Step 2 is an acid hydrolysis conducted in a known manner as described herein for the preparation of compounds X.

The compounds of structural Formula I are useful because they possess pharmacological activity in animals. In particular, the compounds are useful as anti-inflammatory agents as indicated by the carrageenan-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 0.5 milligram to about 150 milligrams per kilogram of body weight, preferably given in divided doses 2 to 4 times a day, or in sustained release form. For most mammals the administration of from about 35 milligrams to about 1000 milligrams of the compound per day provides satisfactory results and dosage forms suitable for internal administration comprise from about 10 milligrams to about 500 milligrams of the compound in admixture with a solid or liquid pharmaceutical carrier or diluent.

The compounds of Formula VII having the following Formula VII–A:

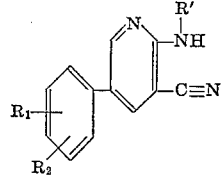

VII–A wherein R′, $R_1$ and $R_2$ are as above defined, are also useful because they possess pharmacological activity in animals. In particular, the compounds of Formula VII–A are useful as anti-inflammatory agents as indicated by the adjuvant arthritis test in rats using Mycobacteria butyricum in Freund's adjuvant. For such use, the compounds may be combined with a pharmaceutically acceptable carrier, and such other conventional adjuvants as may be necessary, and administered orally in such forms as tablets, capsules, elixers, suspensions and the like or parenterally in the form of an injectable solution or suspension. The dosage administered will, of course, vary depending upon the compounds used and the mode of administration. However, in general, satisfactory results are obtained when administered at a daily dosage of from about 0.5 milligram to about 150 milligrams per kilogram of body weight, preferably given in divided doses 2 to 4 times a day, or in sustained release form. For most mammals the administration of from about 35 milligrams to about 1000 milligrams of the compound per day provides satisfactory results and dosage form suitable for internal administration comprise from about 10 milligrams to about 500 milligrams of the compound in admixture with a solid or liquid pharmaceutical carrier or diluent.

For the above usage of the compounds of the Formulae I and VII–A, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby providing a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules preferably contain the active ingredient admixed with an inert solid diluent, e.g., calcium carbonate, calcium phosphate and kaoilin. The preferred pharmaceutical compositions from the standpoint of preparation and ease of admiinstration are solid compositions, particularly solid diluent-filled capsules and tablets.

A representative formulation is a tablet prepared by conventional tabletting techniques and containing the following ingredients:

| Ingredient: | Weight (mg..) |
| --- | --- |
| Compound of Formula I or Formula VII–A | 100 |
| Tragacanth | 10 |
| Lactose | 147.5 |
| Corn starch | 25 |
| Talcum | 15 |
| Magnesium stearate | 2.5 |

EXAMPLE 1

1-isopropyl-4,6-diphenyl-1,2-dihydro-pyrido[2,3-d]pyrimidin-2-one

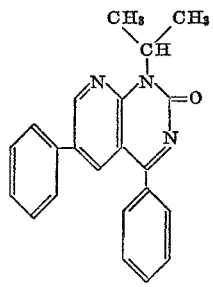

Step A: Preparation of 2-phenyl-3-dimethylaminoacrolein.—To 1380 g. of phosphorus oxychloride is added dropwise 810 g. of dimethylformamide over 1½ hours while maintaining the temperature below 30° C. with ice cooling. To this mixture is added 404 g. of phenylacetic acid in 292 g. of dimethylformamide over a period of 1 hour. The resulting mixture is slowly heated to 70–75° C. and kept at this temperature for 16 hours. The mixture is then cooled, poured onto 10 kg. of ice and 4 kg. of potassium carbonate added while applying external cooling. To the resulting mixture there is added 2 liters of benzene and this mixture refluxed for 12 hours. The mixtureis then cooled, the organic phase separated and the aqueous phase extracted with 2 liters of benzene. The combined organic phases are washed with water and distilled under high vacuum (0.005–0.05 mm. Hg) at 120–160° C. to obtain an oil of 2-phenyl-3-dimethylaminoacrolein.

Step B: Preparation of 3-cyano-55-phenyl-2(1H)-pyridone.—A solution of 35 g. of sodium in 800 ml. of methanol is stirred while a solution of 64 g. of 2-cyanoacetamide and 133 g. of 2-phenyl-3-dimethylaminoacrolein in little methanol are added. The mixture is refluxed for four hours and after cooling the resulting precipitate is filtered off, washed with ethanol, dissolved in hot water and the solution acidified. The resulting precipitate is filtered off and washed with water to obtain 3-cyan-5-phenyl-2-(1H)-pyridone, M.P. 234–237° C.

Step C: Preparation of 2-chloro-5-phenylnicotinonitrile.—To a solution of 105 g. of 3-cyano-5-phenyl-2(1H)-pyridone in 210 ml. of phosphorus oxychloride is added 110 g. of phosphorus pentachloride and the mixture refluxed for 48 hours. The phosphorus oxychloride is evaporated and the residue is treated with a large amount of ice and made alkaline with 50% sodium hydroxide solution (in order to destroy the excess phosphorus pentachloride and some phosphorus oxychloride). A yellowish precipitate is formed, filtered off and dissolved in chloroform. The chloroform solution is extracted with water, dried and evaporated in vacuo to obtain 2-chloro-5-phenylnicotinonitrile, M.P. 139–143° C.

Step D: Preparation of 5-phenyl-2-isopropylaminonicotinonitrile.—A solution of 15 g. of 2-chloro-5-phenyl-nicotinonitrile in 60 ml. isopropyl amine in an autoclave is heated for 4 hours at 130°–140° C. The mixture is then cooled, transferred with chloroform into a flask and evaporated to dryness. The residue is dissolved in in chloroform, extracted twice with water, the organic phase dried over sodium sulfate and evaporated in vacuo. The residue is dissolved in 250 ml. pentane and kept at 0° C. overnight to crystallize out and obtain 5-phenyl-2-isopropylaminonicotinonitrile, M.P. 78–80° C.

Step E: Preparation of [5-phenyl-3-(2-isopropylamino) pyridyl]-phenyl ketone imine.—A solution of 13 g. of 5-phenyl-2-isopropylaminonicotinonitrile in 100 ml. tetrahydrofuran at room temperature is added to a phenylmagnesium bromide solution in tetrahydrofuran (prepared from 4.0 g. of magnesium and 27 g. of bromobenzene in 150 ml. tetrahydrofuran). This mixture is refluxed for 7 hours, cooled and poured into 500 ml. of water. The mixture is evaporated in vacuo to remove tetrahydrofuran and the aqueous phase is extracted two times with methylene chloride, and the organic phase combined, dried over sodium sulfate and evaporated in vacuo to obtain a crude liquid of [5-phenyl-3-(2-isopropylamino) pyridyl]-phenyl ketone imine.

Step F: Preparation of 1-isopropyl-4,6-diphenyl-1,2-dihydro[2,3-d]pyrimidin-2-one.—To a solution of 17 g. of [5-phenyl-3-(2-isopropylamino)pyridyl]-phenyl ketone imine and 30 ml. of triethylamine in 200 ml. benzene is added dropwise under ice cooling 85 ml. of a 12.5% phosgene solution in benzene. The mixture is stirred for 15 minutes at room temperature and then poured in water and made basic with 2 N sodium hydroxide solution. The mixture is then extracted with benzene and the extract washed once with water, dried over sodium sulfate and evaporated in vacuo to obtain a crude product which solidified and which is crystallized from ethyl acetate/diethyl ether/pentane to obtain 1-isopropyl-4,6-diphenyl - 1,2 - dihydro[2,3-d]pyrimidin - 2 - one, M.P. 145–148° C.

EXAMPLE 2

1-isopropyl-4,6-diphenyl-1,2,34-tetrahydro-pyrido[2,3-d]pyrimidin-2-one

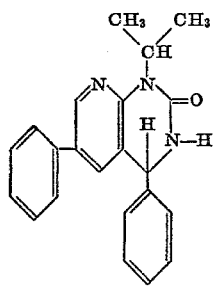

A solution of 5.1 g. of 1 - isopropyl - 4,6-diphenyl-1,2 - dihydropyrido[2,3-d]pyrimidin-2-one in 200 ml.

95% ethanol is stirred and 2.4 g. of sodium borohydride is added in portions at room temperature. The mixture is then stirred at room temperature for 30 minutes, 200 ml. of water is added and the mixture evaporated in vacuo to remove ethanol. The residue is extracted twice with methylene chloride and the combined extracts washed with water, dried and evaporated in vacuo. The resulting crude solid is recrystallized from ethyl acetate/petroleum ether to obtain 1 - isopropyl - 4,6 - diphenyl-1,2,3,4 - tetrahydro-pyrido[2,3-d]pyrimidin-2-one, M.P. 158–161° C.

EXAMPLE 3

2-isopropylamino-5-p-chlorophenyl-nicotinonitrile

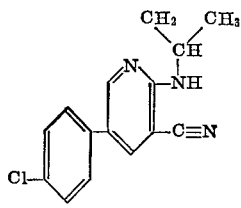

Step A: Preparation of 2 - (p-chlorophenyl) - 3 - dimethylaminoacrolein.—At temperature of 20–30° C. an amount of 81 g. of dimethylformamide is added dropwise to 138 g. of phosphorus oxychloride with external cooling. The mixture is stirred for 15 minutes at room temperature after which period a solution of 50 g. p-chlorophenylacetic acid is added and the mixture heated to 65–75° C. for 20 hours. The reaction mixture is cooled, poured onto 1 kg. of ice and made basic with 5% NaOH (ice cooling) until pH 12. The mixture is then heated on a steam bath for 1 hour. The precipitate which forms is filtered off and washed with a large amount of water. The wet material is dried in vacuo and then crystallized from ethyl acetate to obtain 2-(p-chlorophenyl)-3-dimethylaminoacrolein, M.P. 117–120° C.

Step B: Preparation of 3 - cyano - 5-p-chlorophenyl-2(1H)-pyridone.—A solution of 7 g. of sodium in 300 ml. of methanol is stirred while a solution of 16 g. of 2-cyanoacetamide and 37 g. of 2 - p-chlorophenyl-3-dimethylaminoacrolein in little methanol are added. The mixture is refluxed for one hour and the resulting precipitate is filtered off, washed with ethanol, dissolved in hot water and the solution acidified. The resulting precipitate is filtered off and washed with water to obtain 3 - cyano - 5 - p-chlorophenyl - 2(1H)-pyridone, M.P. 278–280° C.

Step C: Preparation of 2 - chloro - 5 - p-chlorophenyl-nicotinonitrile.—To a solution of 3 g. of 3-cyano-5-p-chlorophenyl-2(1H)-pyridone in 40 ml. of phosphorus oxychloride is added 18 g. of phosphorus pentachloride and the mixture refluxed for 48 hours. The phosphorus oxychloride is evaporated and the residue is treated with a large amount of ice (in order to destroy the excess phosphorus pentachloride and some phosphorus oxychloride). A yellowish precipitate is formed, filtered off and dissolved in chloroform. The chloroform solution is extracted with water, dried and evaporated in vacuo to obtain 2 - chloro - 5 - p-chlorophenylnicotinonitrile, M.P. 176–180° C.

Step D: Preparation of 2 - isopropylamino-5-p-chlorophenylnicotinonitrile.—A mixture of 5 g. of 2-chloro-5-p-chlorophenyl-nicotinonitrile and 60 ml. of isopropylamine is heated in a sealed bomb at temperature of 120° C. for 4 hours. The bomb is then cooled in a Dry Ice bath, opened, the reaction diluted with ethanol and evaporated in vacuo. The residue is dissolved in chlorofrom, washed once with 1 N sodium hydroxide solution and then twice with water, dried and evaporated in vacuo. The solid residue is filtered through silica gel with benzene to obtain an oil which solidified on standing. This solid is then crystallized from methylene chloride/pentane to obtain 2 - isopropylamino-5-p-chlorophenylnicotinonitrile, M.P. 119–123° C.

EXAMPLE 4

Following the procedure of Example 3 the following compound is prepared:

(a) 2-tert.-butylamino-5-phenyl-nicotinontrile, M.P. 72–75° C. (Crystallization from petroleum ether.)

EXAMPLE 5

Following the procedure of Steps D and E of Example 1 the following compounds are prepared:

(a) 1 - isopropyl - 6 - p-chlorophenyl - 4-phenyl-1,2-dihydropyrido[2,3-d]pyrimidin-2-one.
(b) 1 - tert.-butyl - 4,6 - diphenyl-1,2-dihydro-pyrido[2,3-d]pyrimidin-2-one.

What is claimed is:
1. A compound of the formula:

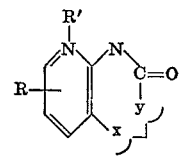

wherein

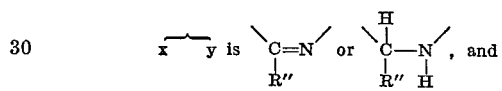

R' is lower alkyl; allyl; methallyl; propargyl; or cycloalkyl of 3 to 6 carbon atoms; and R is

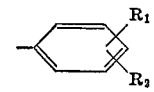

each of $R_1$ and $R_2$ is independently hydrogen, fluoro, chloro, bromo or lower alkoxy, R'' is phenyl or substituted phenyl of the formula:

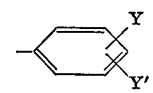

Y represents fluoro, chloro, bromo, lower alkyl or lower alkoxy; and
Y' represents hydrogen, fluoro, chloro, bromo, lower alkyl or lower alkoxy.

2. A compound of claim 1 in which

3. A compound of claim 2 in which R' is lower alkyl.
4. A compound of claim 3 in which each of $R_1$ and $R_2$ is hydrogen.
5. A compound of claim 4 in which R'' is phenyl.
6. The compound of claim 5 in which R' is tert.-butyl.
7. The compound of claim 5 in which R' is isopropyl.
8. A compound of claim 3 in which $R_1$ is p-chloro and $R_2$ is hydrogen.
9. The compound of claim 8 in which R' is isopropyl and R'' is phenyl.
10. A compound of claim 1 in which

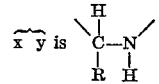

11. A compound of claim 10 in which R' is lower alkyl.

12. A compound of claim 11 in which R″ is phenyl.
13. A compound of claim 12 in which each of $R_1$ and $R_2$ is hydrogen.
14. A compound of the formula:

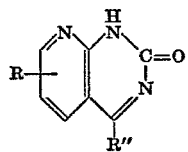

wherein R and R″ are as defined in claim 1.
15. A compound of claim 14 in which R″ is phenyl.

16. The compound of claim 15 in which each of $R_1$ and $R_2$ is hydrogen.

References Cited

UNITED STATES PATENTS 3,320,257  5/1967  Lesher _____ 260—256.4 F

ALEX MAZEL, Primary Examiner
R. J. GALLAGHER, Assistant Examiner

U.S. Cl. X.R.

260—294.9, 296 R; 424—251, 263